(12) United States Patent
Petrenko et al.

(10) Patent No.: US 6,653,598 B2
(45) Date of Patent: Nov. 25, 2003

(54) METHODS AND SYSTEMS FOR REMOVING ICE FROM SURFACES

(75) Inventors: Victor Petrenko, Lebanon, NH (US); Charles Sullivan, Hanover, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 0 days.

(21) Appl. No.: 09/914,817

(22) PCT Filed: Mar. 1, 2001

(86) PCT No.: PCT/US00/05665

§ 371 (c)(1),
(2), (4) Date: Apr. 23, 2002

(87) PCT Pub. No.: WO00/52966

PCT Pub. Date: Sep. 8, 2000

(65) Prior Publication Data

US 2002/0175152 A1 Nov. 28, 2002

Related U.S. Application Data

(63) Continuation-in-part of application No. PCT/US99/28330, filed on Nov. 30, 1999.
(60) Provisional application No. 60/122,463, filed on Mar. 1, 1999, and provisional application No. 60/131,082, filed on Apr. 26, 1999.

(51) Int. Cl.[7] .................................. H05B 3/00
(52) U.S. Cl. ........................................ 219/201; 307/41
(58) Field of Search ........................... 174/40 R, 102 R, 174/115, 128.1, 149 R; 219/209, 483–486, 501, 507, 508, 505, 481, 494, 201; 307/147, 41; 361/1

(56) References Cited

U.S. PATENT DOCUMENTS

| | | | | |
|---|---|---|---|---|
| 2,870,311 A | * | 1/1959 | Greenfield et al. | 219/209 |
| 3,316,344 A | | 4/1967 | Kidd et al. | |
| 3,316,345 A | | 4/1967 | Toms et al. | |
| 4,082,962 A | * | 4/1978 | Burgsdorf et al. | 219/209 |
| 4,085,338 A | * | 4/1978 | Genrikh et al. | 219/209 |
| 4,190,137 A | | 2/1980 | Shimada et al. | |
| 5,143,325 A | | 9/1992 | Zieve et al. | |
| 6,018,152 A | | 1/2000 | Allaire et al. | |

* cited by examiner

*Primary Examiner*—Tu Ba Hoang
(74) *Attorney, Agent, or Firm*—Curtis A. Vock; Lathrop & Gage L.C.

(57) ABSTRACT

A coating (626) comprising a ferroelectric, lossy dielectric, ferromagnetic or semiconductor material is disposed near an object (620). AC current flows through an electrical conductor (624), creating an electromagnetic field. The coating (626) absorbs energy from the electromagnetic field, thereby generating heat, which melts snow and ice on the object (620).

26 Claims, 17 Drawing Sheets

METHODS AND SYSTEMS FOR REMOVING ICE FROM SURFACES

This application is a continuation-in-part application of commonly-owned and copending PCT application PCT/US99/28330, filed Nov. 30, 1999, and is based partly on U.S. provisional application Nos. 60/122,463, filed on Mar. 1, 1999 and 60/131,082, filed on Apr. 26, 1999, each of which is hereby incorporated by reference.

U.S. GOVERNMENT RIGHTS

This invention was made in part with the support of the U.S. Government; the U.S. Government has certain rights in this invention as provided for by the terms of Grant #DAAH 04-95-1-0189 awarded by the Army Research Office and of Grant #MSS-9302792 awarded by the National Science Foundation.

BACKGROUND OF THE INVENTION

1. Field of the Invention

The invention relates to methods, systems and structures for removing ice from surfaces.

2. Statement of the Problem

Ice adhesion to certain surfaces causes many problems. For example, icing on power lines adds weight to the power lines causing them to break. In addition to the costs of repair, the resulting power outages cause billions of dollars in direct and indirect economic damage. The large surface areas of power lines exposed to icing conditions and the remoteness of many lines require de-icing systems that are both reliable and have low costs per unit distance.

Excessive ice accumulation on aircraft wings endangers the plane and its passengers. Ice on ship hulls creates navigational difficulties, the expenditure of additional power to navigate through water and ice, and certain unsafe conditions. The need to scrape ice that forms on automobile windshields is regarded by most adults as a bothersome and recurring chore; and any residual ice risks driver visibility and safety.

Icing and ice adhesion also causes problems with helicopter blades, and with public roads. Billions of dollars are spent on ice and snow removal and control. Ice also adheres to metals, plastics, glasses and ceramics, creating other day-to-day difficulties. In the prior art, methods for dealing with ice vary, though most techniques involve some form of scraping, melting or breaking. For example, the aircraft industry utilizes a de-icing solution such as ethyl glycol to douse aircraft wings so as to melt the ice thereon. This process is both costly and environmentally hazardous; however, the risk to passenger safety warrants its use. Other aircraft utilize a rubber tube aligned along the front of the aircraft wing, whereby the tube is periodically inflated to break any ice disposed thereon. Still other aircraft redirect jet engine heat onto the wing so as to melt the ice.

These prior art methods have limitations and difficulties. First, prop-propelled aircraft do not have jet engines. Secondly, rubber tubing on the front of aircraft wings is not aerodynamically efficient. Third, de-icing costs are extremely high, at $2500–$3500 per application; and it can be applied up to about ten times per day on some aircraft.

With respect to many types of objects, resistive DC heating of ice and snow is common. But, heating of some objects is technically impractical. Also, large energy expenditures and complex heating apparati often make heating too expensive.

SOLUTION

The invention provides systems and methods for removing or preventing the formation of ice on power lines, airplane wings and other objects.

A system in accordance with the invention for preventing ice and snow on a surface of an object contains an electrical conductor integral with the surface. The conductor is configured to generate an alternating electromagnetic field in response to an AC current. A system also includes a coating integral with both the surface and with the electrical conductor. The coating is configured to generate heat in response to the alternating electromagnetic field. The coating contains a material selected from the group of materials consisting of ferroelectric, lossy dielectric, semiconductor and ferromagnetic materials. A conductor is "integral" with a surface if the surface is within an alternating electromagnetic field generated by an AC current flowing in the conductor. A coating is "integral" with both a conductor and a surface if both the coating is within an alternating electromagnetic field generated by an AC current flowing in the conductor and if the heat generated by the coating prevents ice on the surface. As a practical matter, both conductor and coating are commonly structurally included in the object being protected from ice and snow, for example a power line or an airplane wing. When the heat-generating coating is included in the surface, or is in direct physical contact with the surface, heat transfer between coating and surface is enhanced. Typically, the surface of a conductor itself is being protected; for example, the surface of a conductive airplane wing may be protected by disposing a coating in accordance with the invention on the wing surface and flowing AC current through the wing. The surface of a power line is typically an insulator casing enclosing the main conductors. Conductors may be formed on the surface of the object being protected by various techniques, including photolithography.

In many embodiments in accordance with the invention, for example, in power lines, AC current is already present to generate the alternating electromagnetic field, causing heat in the coating. In other embodiments, a dedicated AC power source may be used to provide AC current; for example, in systems to de-ice airplane wings.

In a typical embodiment, the surface comprises the coating; for example, a coating may adhere permanently to the surface of a power line. In other instances, a coating may be embedded in the object being protected, below the surface exposed to icing; for example, a coating in accordance with the invention may be formed as a layer enclosed within in an airplane wing. Or a coating may be completely separate from the object being protected, being disposed within an integral distance, either permanently or temporarily, to heat the surface of the object.

The coating may be a ferromagnetic material configured to generate heat in response to an alternating magnetic field. Other types of coating may be configured to generate heat in response to a capacitive AC current. In such embodiments, the AC current in the conductor creates an alternating electric field ("AEF"), that generates a capacitive AC current in the coating. The capacitive AC current causes heating in the coating. In such embodiments, earth may function as a sink for the capacitive AC current, or another power line may function as a sink, or a special sink may be provided. The coating may comprise semiconductor material configured to generate heat in response to a capacitive AC current. An example of such a semiconductor material is ZnO. The coating may comprise ferroelectric material configured to generate heat in response to a capacitive AC current. Typically, the ferroelectric material has a dielectric constant that changes as a function of temperature, the coating having a low dielectric constant at a temperature above freezing, and a high dielectric constant below freezing. For example, the ferroelectric material may have a Curie temperature, Tc, in the range of from 250° to 277° K. The coating may comprise lossy dielectric material configured to generate heat in response to a capacitive AC current. The lossy dielectric material may be chosen to have a dielectric loss maximum at an AC frequency in a range of from 40 to 500 Hz when relatively low-frequency AC current is used to prevent icing. On the other hand, the lossy dielectric material may have a dielectric loss maximum at an AC frequency in a range of from 0.5 to 300 kHz when relatively high-frequency AC current is used to prevent ice. For example, if the coating has a dielectric loss maximum at 6 kHz, then the de-icing function can be turned "on" by switching the AC current from low frequency 60 Hz to 6 KHz. The coating thickness is typically selected to correspond to an amount of heat desired to be generated by the coating. In a particularly simple embodiment, the lossy dielectric material coating is ice itself. In embodiments applied to power lines, the power source typically provides AC current in a range of from 100 to 1000 kV.

An embodiment in accordance with the invention may include a conductive shell, the coating disposed between the electrical conductor and the conductive shell. An example is an aluminum conductive shell surrounding the coating of a power line, thereby forming the outer surface of the power line. By electrically shorting the conductor and the conductived shell when no de-icing is required, the capacitive AC current in the coating is eliminated, no heat is generated by the coating, and no energy is wasted. As with the conductor, the conductive shell may be formed by photolithography. An embodiment typically includes a switch for controlling the electrical connection that shorts conductor and conductive shell. An insulated-gate-bipolar-transistor ("IGBT") power semiconductor switch is well suited. An embodiment typically comprises a control box deriving its power from the alternating electric field. The control box can be remotely controlled; for example, by a radio signal or by a carrier signal. The control box can also be controlled locally and autonomously based on input by a local sensor. For example, the local sensor may include a temperature sensor or an impedance sensor for detecting ice. A typical impedance sensor comprises a 100 kHz impedance sensor. In some embodiments, a control box may comprise a control box case capable of serving as an antenna for gathering energy from the alternating electric field to power the control box. An embodiment may include a number of control boxes, monitoring different sections of the system. For example, a plurality of control boxes may be spaced apart every 5 km or every 50 km along a power line.

An embodiment may include a transformer to transform AC current having a low-voltage to a higher voltage sufficient to generate heat in a coating. Such transformers, for example, may be located at appropriate distance intervals along power lines.

Embodiments in which the coating is ice preferably include a means for frequency-tuning the high-frequency AC current to match the standing-wave effects of ice-dielectric heating and the skin-effect heating resulting from high-frequency current flow in a conductor. An embodiment may also include a means for varying the high-frequency AC current to change the heating pattern produced by standing wave effects of ice-dielectric heating and skin-effect heating, thereby providing sufficient heat at all locations at various times to prevent icing.

In summary, AC current flows through an electrical conductor, creating an electromagnetic field. A coating absorbs the electromagnetic energy, generating heat. The heat from the coating heats the surface of the object being protected above the melting point of ice. The coating material may be a ferroelectric, a lossy dielectric, a semiconductor, or a ferromagnetic material. In some embodiments, the dielectric or magnetic loss properties of the coating depend on a specific temperature. These properties cause the absorption of electromagnetic energy and the resulting heating of the wires only when the ambient temperature drops below the ice's melting point. In other embodiments, the absorption of energy depends on the frequency of the AC current. A system in accordance with the invention may also include a conductive shell such that the coating material is between the conductor and the conductive shell. By electrically shorting the conductor and the conductive shell, the heating may be switched "off", conserving energy.

In a particular variation, ice itself is utilized as a lossy dielectric coating at high frequency, such as at 60 kHz. Further, skin-effect heating at high frequency may be combined with dielectric heating to melt ice and snow on power lines.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE PREFERRED EMBODIMENTS

The invention includes methods, systems and structures that prevent ice and snow on surfaces of objects by using a coating configured to absorb electromagnetic energy emanating from an AC current. This absorption heats the coating, which heats the surface to prevent ice. Although embodiments in accordance with the invention are described below principally with respect to power line de-icing, it is understood that the invention is useful in many types of applications.

De-Icing of Power Lines

Figure 1:
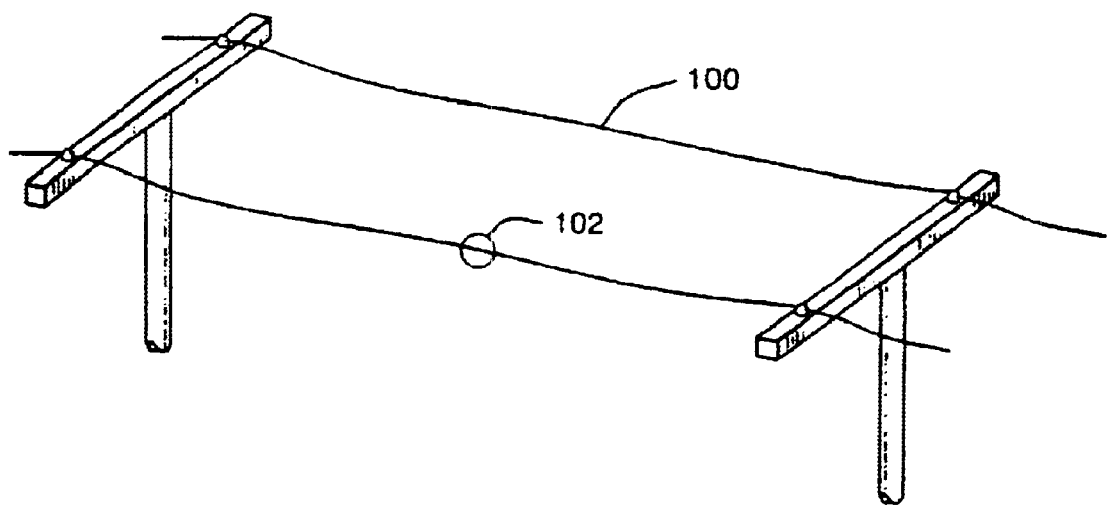
FIG. 1 depicts an embodiment of the invention suitable to reduce or remove ice from coated power lines.
Figure 2:
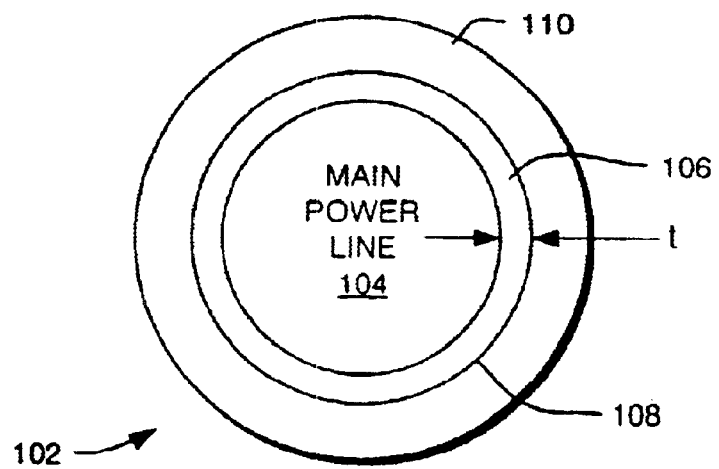
FIG. 2 shows a cross-sectional view of a coated power line fabricated in accordance with the invention.

FIG. 1 and FIG. 2 depict an embodiment in accordance with the invention suitable to prevent or remove ice on power lines 100. FIG. 2 shows a cross-sectional view 102 of power line 100 constructed in accordance with the invention. A coating 106 having a thickness of "t" is applied over the line 104. As known in the art, a typical main power line 104 carries power at 60 Hz, but with very high alternating electric fields, such as 4,000 volts/cm. The coating 106 generates heat in the presence of an alternating electromagnetic field, such as generated by the main power line 104. Specifically, it exhibits hysteresis that generates heat over the AC cycle. Thus, heat is generated from previously unused power to melt or prevent ice on the power line. This embodiment utilizes the alternating electricmagnetic fields that already exist due to the current flowing through the power line.

The coating 106 may be a ferroelectric material, as known in the art. Ferroelectric materials are essentially ceramics that exhibit a very high dielectric constant (e.g., 10,000) and very high dielectric loss (e.g., tan $\delta \cong 10$) at certain conditions, and a relatively low dielectric constant (3–5) and small dielectric loss at other conditions. One condition that can change the constant is temperature. Typically, the material is selected so that above freezing, the dielectric constant is low, and below freezing temperatures, the constant is high. When ambient temperature drops below the freezing point, the coating is intensively heated by the alternating electric field ("AEF") due to the high dielectric constant and dielectric loss.

More particularly, when a ferroelectric or lossy dielectric material is placed in an AEF, the material is heated by the field due to a dielectric loss. The heating power per cubic meter is:

$$W = \frac{\omega \varepsilon \varepsilon_o}{4\pi} \tan\delta(\overline{E^2}) \qquad (1)$$

where $\epsilon$ is a relative dielectric permittivity (usually $\epsilon$ is approximately $10^4$ for typical ferroelectrics), $\epsilon_0$ is a dielectric permittivity of free space ($\epsilon_0$=8.85E−12 F/m), $\omega$ is an angular frequency of the AC field ($\omega$=2πf, where f is a usual frequency for the power line, e.g., 60 Hz in conservative power lines), tan $\delta$ is the tangent of dielectric loss, and $(\overline{E^2})$ is the average of electric field squared.

Ferroelectrics are characterized with very large values of $\epsilon$ and tan $\delta$ below the so-called Curie Temperature, $T_c$, and small $\epsilon$ and tan $\delta$ above $T_c$. Thus, the dielectric loss (or heating power of the AC electric field) is very high below and close to $T_c$; and it drops by a large factor (e.g., $10^6$) above that temperature. This makes ferroelectrics with $T_c$ close to or just above the melting temperature an optimum choice for a coating 106 such as described above. Such coatings absorb the electric power when the outside temperatures drop below the melting point, $T_m$, and are heated by the field to a temperature above $T_m$ so that they again transform into usual insulators (i.e., no longer absorbing the electric field in significant quantity).

Accordingly, when such coatings are placed in an AC field, the ferroelectric material maintains a constant temperature which is close to $T_c$ and just above $T_m$. This self-adjusting mechanism to prevent icing is very economic: the maximum heating power per one meter of the power line, or per $m^2$ at any surface to be protected, can be increased or decreased by changing the coating thickness and/or by adding a neutral (not ferroelectric) insulating paint or plastic to the coating. Examples of suitable ferroelectric materials according to the invention include:

TABLE 3

| Ferroelectric materials | | |
|---|---|---|
| Name | Formula | $T_c$ (Kelvin) |
| Rochelle salt | NaKC$_4$H$_4$O$_6$4H$_2$O | 255–297 |
| Deuterated Rochelle salt | NaKC$_4$H$_2$ D$_2$O$_6$ 4H$_2$O | 251–308 |
| TGSe | (NH$_2$CH$_2$COOH)$_3$ H2Se)$_4$ | 295 |
| Potassium tantalate niobate | KT$_{a2/3}$ N$_{b1/3}$ O$_3$ | 271 |
| Anti momium nitrate | NH$_4$NO$_3$ | 255, 305 |
| Lead magnesium niobate | Pb$_3$MgNb$_2$O$_9$ | ~273 (0° C.) |

The thickness "t" is typically on the order of 0.5 mm to 10 mm, although other thicknesses can be applied depending upon coating materials and desired heating. By changing the thickness, for example, temperatures at the surface 108a can be increased by 1–10 degrees, or more. The thickness "t" is chosen so that a desired amount of heat is generated (i.e., heat typically sufficient to melt ice and snow on the surface 108 of the line 100).

Figure 3:
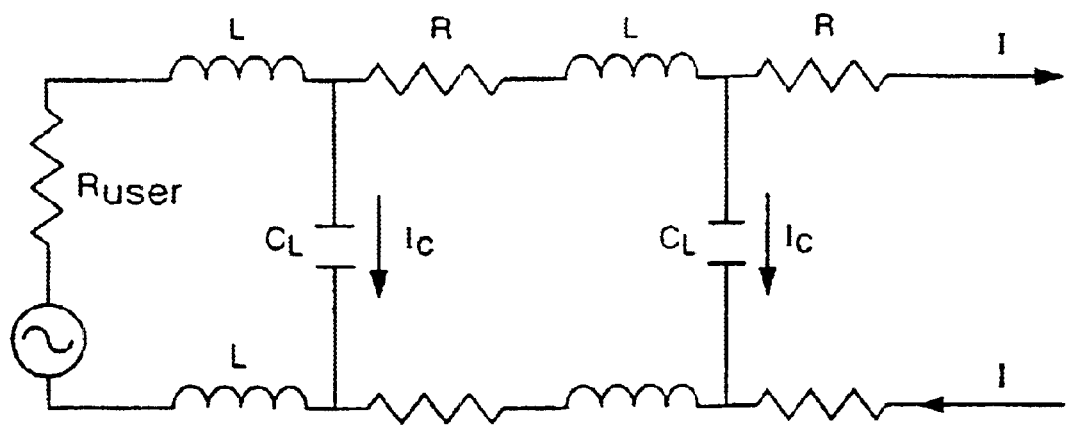
FIG. 3 shows an equivalent electric circuit of a power line without a coating.
Figure 4:
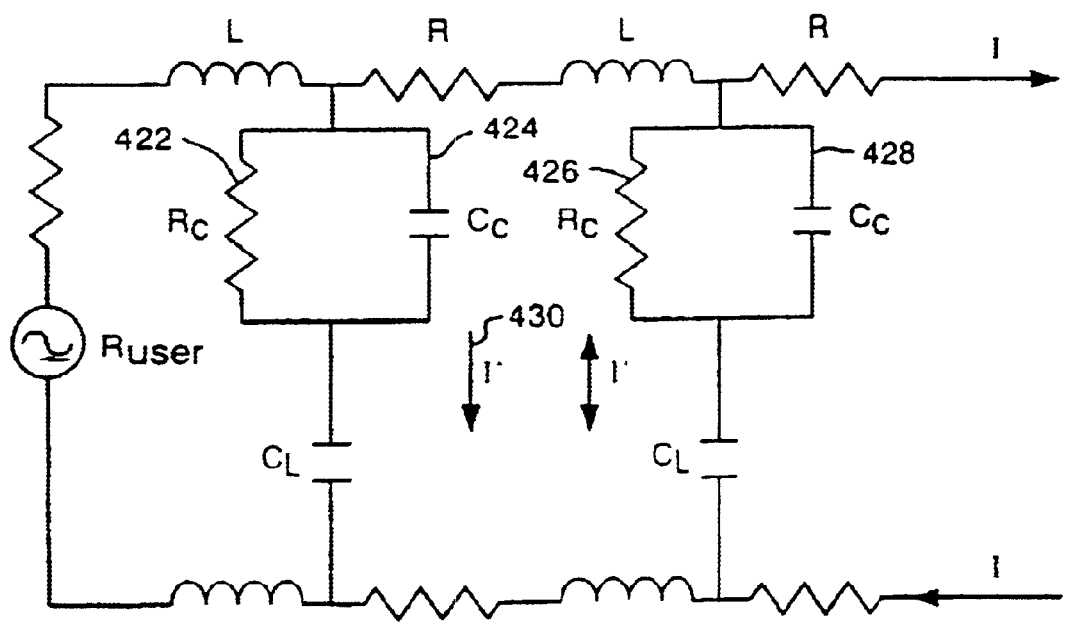
FIG. 4 shows an equivalent electric circuit of an identical power line with a coating.

FIG. 3 shows an equivalent electric circuit of a power line without a coating 106. Those skilled in the art understand the use of this configuration of resistors, capacitors, and inductors to represent the power line. Capacitance $C_L$ is an "interwire capacitance". Without a coating, the capacitive AC current, $I_C$, is not used to generate heat. FIG. 4 shows an equivalent electric circuit of an identical power line with a dielectric or terroelectric coating 106. The coating 106 is represented in FIG. 4 by the resistances, $R_C$ 422 and 426, and the capacitances, $C_C$ 424 and 428. In FIG. 4, a capacitive current flowing through the interwire capacitance $C_L$ and the coating is represented by I' 430. I' 430 is less than $I_C$ because of the added resistance and capacitance of the coating 106. Thus, the power loss in the rest active loads (R, $R_{user}$) decreases as a result of the heat dissipation in the coating.

The heating power, $W_h$, of a ferroelectric or lossy dielectric coating on a cylindrical conductor is represented by the equation:

$$W_h = \frac{V^2 \omega^2 R C_L^2}{1 + \omega^2 R^2 (C_L + C_C)^2} \quad (2)$$

where V is the voltage, $\omega$ is the angular frequency ($2\Pi f$, R is the active resistance (per meter) of the coating, $C_L$ is an efficient interwire capacitance, and $C_C$ is the coating's capacitance (per meter). $C_L$ may be calcualted using known techniques and includes interactions between the conductor and various sinks of capacitive AC current, for example other phase wires, ground wires and earth. The maximum power occurs when:

$$R = \frac{1}{\omega(C_L + C_C)} \quad (3)$$

Combining Equations 25 and 26 will result in the maximum heating power, $W_{max}$:

$$W_{max} = \frac{V^2 \omega C_L^2}{2(C_L + C_C)} \quad (4)$$

When the coating reaches the condition for maximum power at the frequency $f_0 = \omega_0/2\Pi$, then the heating power at any other frequency f is shown in the following equation:

$$W_h = \frac{2 W_{max} \left(\frac{f}{f_0}\right)^2}{1 + \left(\frac{f}{f_0}\right)^2} \quad (5)$$

EXAMPLE 1

Exemplary heating power calculations were conducted for $Pb_3MgNb_2O_9$. In this example, a middle range power line was considered with $\sqrt{V^2}$=10 kV and with a wire diameter of 1 cm=2×radius. Accordingly, the electric field strength on the wire surface is:

$$E \approx \frac{V}{\ln\left(\frac{L}{r}\right) r} \approx 3 \text{ kv/cm} \quad (6)$$

where L is the distance between wires (L=1 m). Substitution as above, i.e., $\overline{E^2}$=3×10 V/m, $\omega$=2π×60 Hz, $\epsilon$=104 and tan $\delta$=10, computes to W (at 1 mm, 60 Hz)=4.5×10⁵ watts/m³. A 1 mm thick film, for example, thus generates 450 watt/m², which is more than sufficient for typical melting of ice.

A frequency of 100 kHz at 300 kV heats a 1 mm thick coating of $Pb_3MgNb_2O_9$, at a rate 750 kWatt/m².

When applied to power lines, the maximum power that can be dissipated in the coating is limited by a capacitance $C_L$ between the wires:

$$W_{max} = \frac{\omega C_L}{2} \cdot \overline{V^2} \quad (7)$$

For wires of 2 cm thickness, with 1 m distance between wires, $C_L \cong 1.21E-11$ F/m. For a power line at V=350 kV, $W_{max} \cong 300$ Watt/m, which is sufficient energy to keep a 1 m long cable free of ice.

EXAMPLE 2

Figure 5:
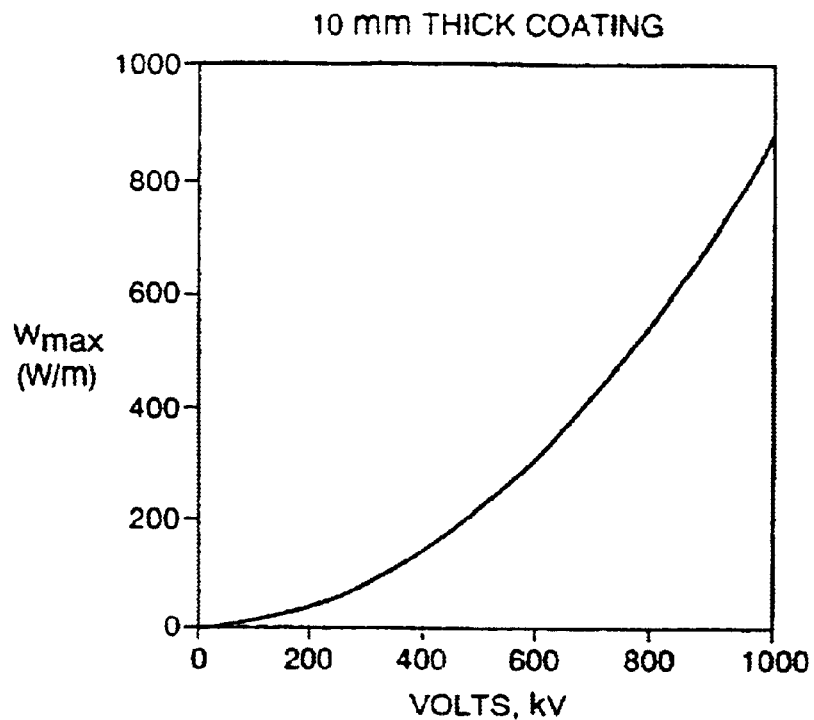
FIGS. 5–7 show the results of calculations of maximum heating power, in units of watts per meter, as a function of voltage when using different thicknesses of a dielectric coating.
Figure 6:
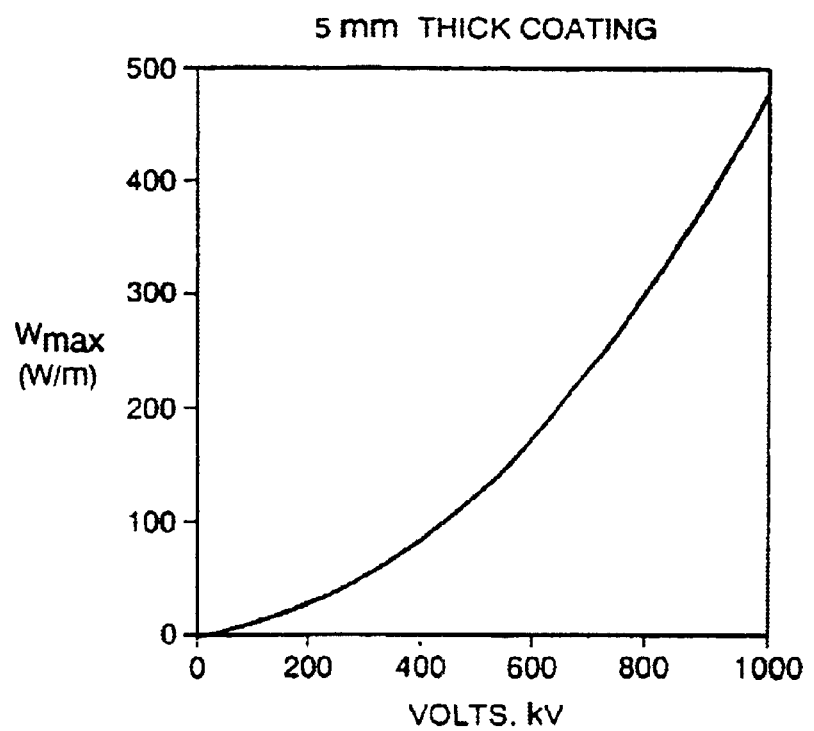
Figure 7:
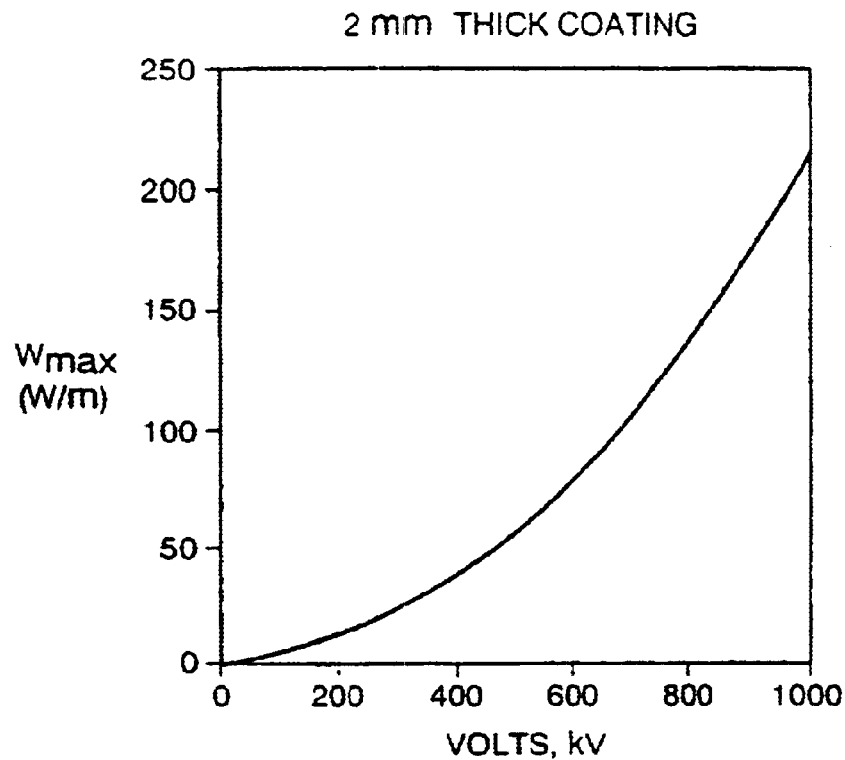

Using Equation (4), the maximum heating power, $W_{max}$, in units of watts per meter, was calcualted as a function of voltage for conductors having different thicknesses of a dielectric coating on phase 1 of a 3-phase power transmission system. The following variable values were used: radius, r, of the main conductor of the power line, 1.41 cm; radius of outside surface of coating was 1.41 cm plus the respective coating thickness; interwire distance, 7.26 m; phase to ground-wire distance, 6.44 m; phase to earth distance, 20.24 m; $\epsilon_0$, 8.85×10⁻¹²; $\delta$, 2.0; frequency, 60 Hz. FIG. 5 shows the heating power as a function of voltage for a dielectric coating of 10 mm thickness. FIG. 6 shows the heating power as a function of voltage for a dielectric coating of 5 mm thickness. FIG. 7 shows the heating power as a function of voltage for a dielectric coating of 2 mm thickness. It is known that about 50 W/m is required to keep a power line free of ice.

Figure 8:
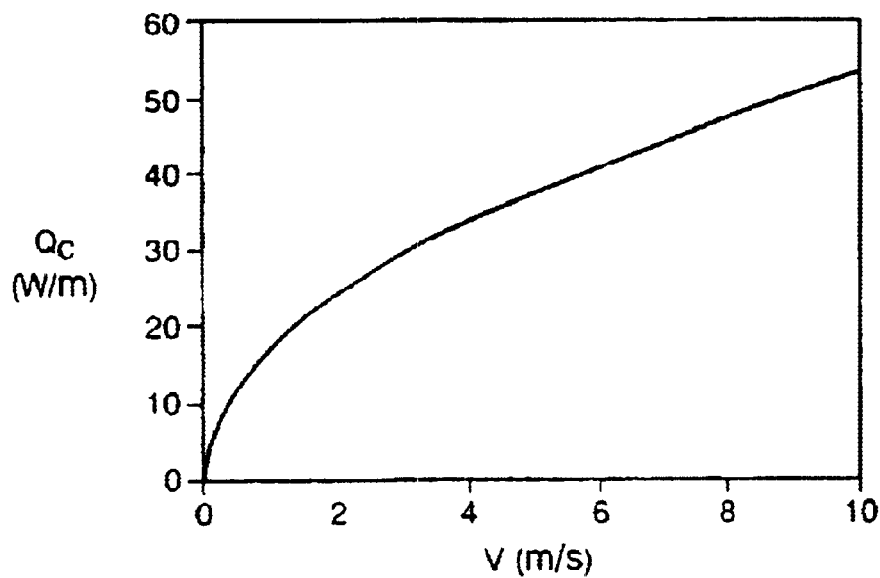
FIG. 8 shows the heat transfer from a 2.5 cm conductor as a function of wind velocity with a $\Delta T$ of 10° C.
Figure 9:
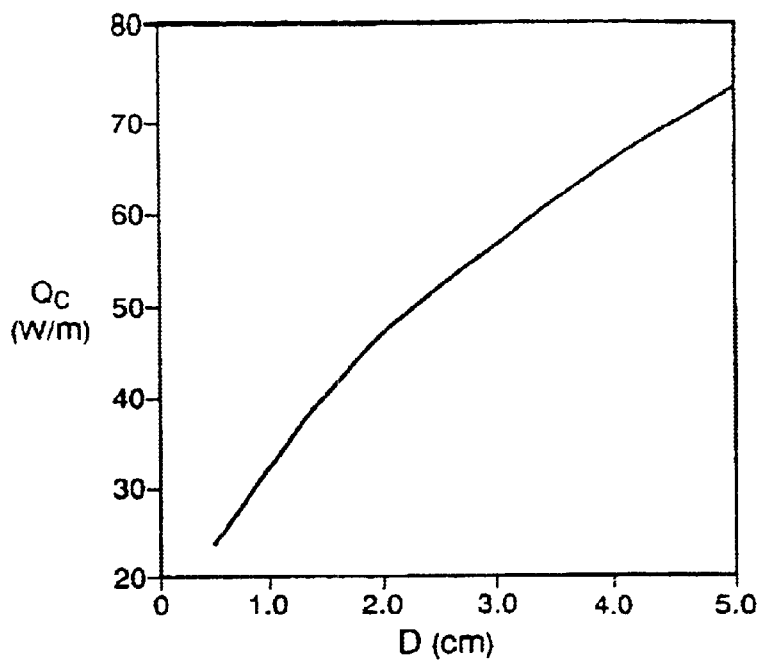
FIG. 9 depicts heat transferred from a conductor plotted as a function of conductor diameter with a wind velocity of 10 m/s.

In addition to thickness of dielectric coating, the heating dissipation is also dependent on wind blowing on the power lines. If significant amounts of heat are removed from a power line by wind, then an increase in heating power becomes necessary. The heat transfer from a 2.54 cm conductor with a ΔT of 10° C. was calculated using conventional methods. In the graph of FIG. 8, heat transfer is plotted as a function of the velocity of wind hitting the power line. The diameter of the conductor also will affect the heat transfer when wind is present. In the graph of FIG. 9, heat transfer is plotted as a function of the diameter of the conductor with a wind velocity of 10 m/s and ΔT of 10° C. In accordance with the invention, when the coating exhibits low dielectric constant and loss (i.e., when the coating is above "freezing" or some other desired temperature), much less heat is generated by the coating 306 and, thereby, much less energy is expended and lost by line 302.

Those skilled in the art should appreciate that the surface of objects other than described herein can also be treated with these coatings. For example, applying such a coating to an airplane wing will also provide melting capability by subjecting the coating to AC and, particularly, by increasing the voltage and frequency of the AC, as indicated in Equation (4) above.

In addition to ferroelectrics and dielectrics, almost any semiconductor coating will provide similar effects. A semiconductor will absorb the maximum energy from the external AC electric field when its conductivity $\sigma$ and dielectric permittivity $\epsilon$ satisfy the condition:

$$\frac{\varepsilon\varepsilon_0}{\sigma} = \tau_{max} = \frac{1}{2\Pi f} \qquad (8)$$

where $\epsilon$ is the coating's dielectric constant, $\epsilon_0$, is that of free space, and f is the frequency of the AC field. As a result, the dielectric loss depends on the conductivity $\sigma$. To reach the maximum performance of Equation (4), the coating dielectric conductivity $\sigma$ should satisfy the condition:

$$\sigma \approx \epsilon\epsilon_0 \omega \qquad (9)$$

where $\epsilon$ is the coating's dielectric constant, and $\epsilon_0$ is that of free space. For a 60Hz line and $\epsilon \approx 10$, $\sigma \approx 3.4E-8$ (ohm.m)$^{-1}$. Such conductivity is very typical for many undoped semiconductors and low-quality insulators. Thus, such a coating is not expensive (certain paints qualify for these coatings). Moreover, temperature "tuning" can be achieved due to a strong temperature dependence of conductivity of semiconductor materials (e.g., an exponential dependence).

Figure 10:
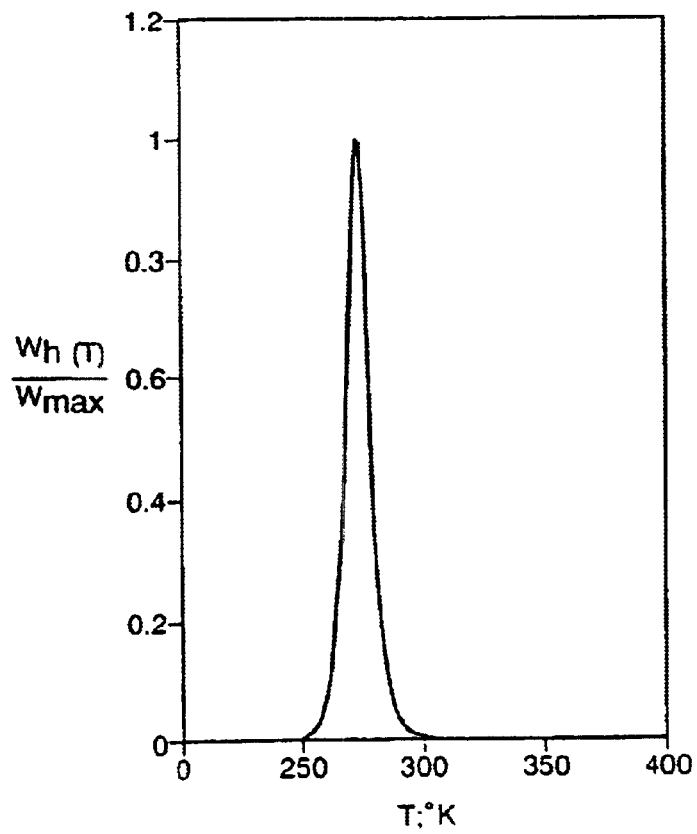
FIG. 10 shows the temperature dependence of normalized heating power of a 1 mm thick coating of ZnO on a 1000 MW power line, where the ice melting point is 273° K.

One suitable material for semiconductive coatings is ZnO. FIG. 10 shows the temperature dependence of normalized heating power of a 1 mm thick coating of ZnO on a 1000 MW power line, where the ice melting point is 273° K. As suggested by the curve in FIG. 10, optimal conditions for the type of dielectric heating described above is typically satisfied only in a narrow temperature interval, e.g., $-10°$ C.$\leq$T$\leq$10° C., where the coating will melt ice, otherwise consuming little power. Those skilled in the art understand that dopants could always be used to adjust the temperature interval.

Those skilled in the art should appreciate that the above-described embodiment of ferroelectric and semiconductor coatings can be self-regulating in keeping the coating temperature close to (or slightly above) the melting point. For example, if a ferroelectric coating is overheated by the power line's electric field, it automatically undergoes a phase transformation from the ferroelectric to the normal state, at which point the coating stops absorbing the electric field energy. By choosing a phase transition temperature, therefore, the coating temperature can be adjusted per user needs and per the environmental conditions of the local area.

In another embodiment, coating 306 of a power line is a ferromagnetic material, as known in the art. In this case, the coating absorbs the energy of the magnetic field generated by a power line. A ferromagnetic coating with $T_C=T_M$ melts ice in the same manner as a ferroelectric material by converting the energy of a magnetic field generated by the AC current of the power line into heat.

Those skilled in the art should appreciate that the surface of objects other than described herein can also be treated with these coatings. For example, applying such a coating to an airplane wing will also provide melting capability by subjecting the coating to AC and, particularly, by increasing the AC voltage and frequency, as indicated by Equation (4) above.

Figure 11:
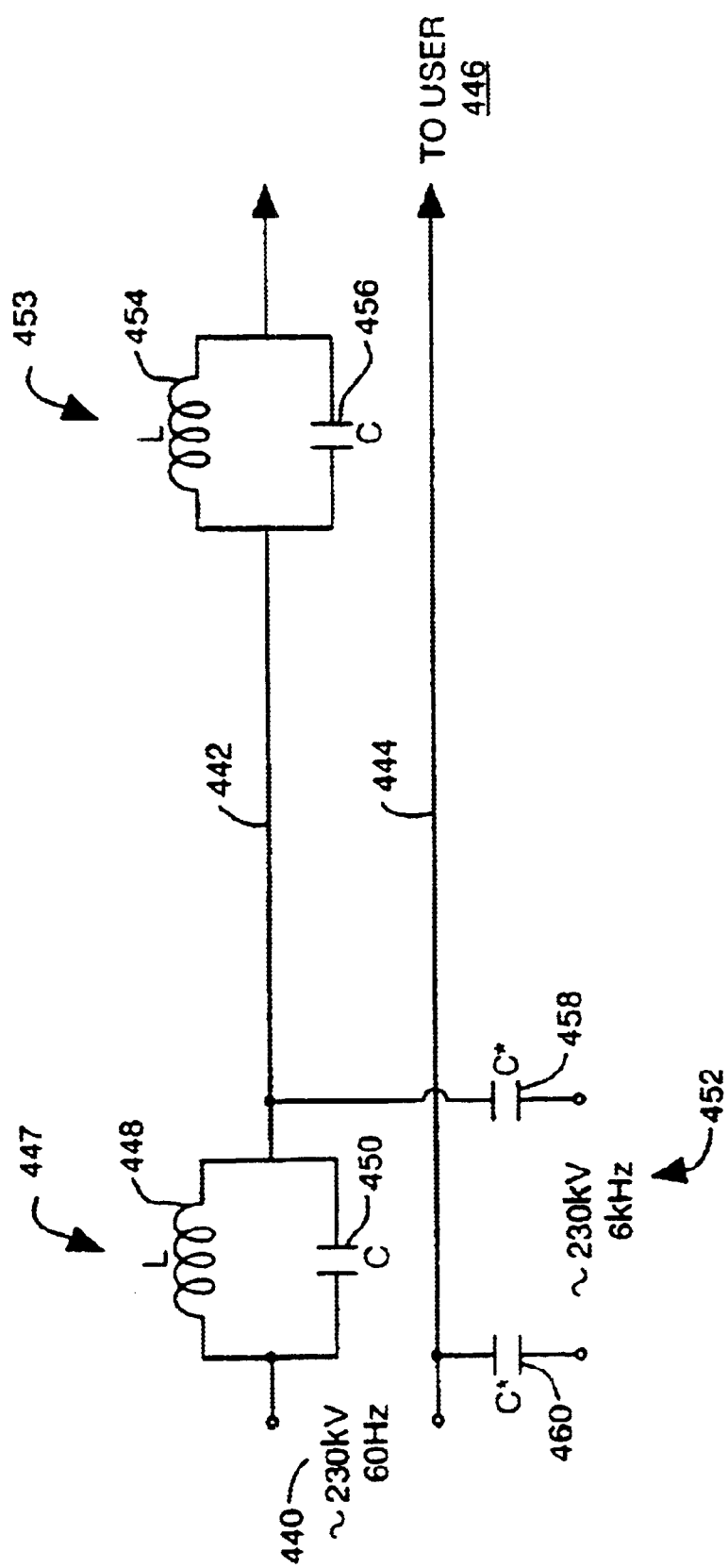
FIG. 11 depicts a circuit diagram in which two resonance contours are used to prevent a 6 kHz voltage from passing to a 60 Hz power supply.

A coating may be used containing a lossy dielectric material having a maximum dielectric loss at higher frequencies, in a range of from 0.5 to 300 kHz. When an AC current in the conductor has a low frequency in a range of from 40 to 500 Hz, there is virtually no energy dissipated as a result of dielectric heating. When the AC current has a frequency near its maximum dielectric loss frequency, then heating occurs. By switching between high and low AC frequencies, the heating can be switched "on" and "off". The heating power for a given dielectric coating material and set of operating conditions is calculated using Equations 2–5, above. The strong dependence of heating power of dielectric coatings on the frequency shows why the power line is heated when, for example, 6 kHz voltage is applied instead of 60 Hz AC. High frequency AC current may be supplied using a separate AC power supply as a power source. Or, frequency multipliers as known in the art may be used to multiply the output of a low-frequency power supply to make high-frequency AC current. A sketch of a representative electrical circuit diagram of an embodiment using high-frequency AC current to deice a power line in a 2-phase system is show in FIG. 11. In FIG. 11, a power line supply 440 at 230 kV and 60 Hz is connected to a first power line 442 and a second power line 444. On the other end, a user 446 is connected to power lines 442, 444. First power line 442 includes circuit unit 447 comprising inductance 448 in parallel with capacitance 450. First power line 442 also includes series unit 453, comprising inductance 454 in parallel with capacitance 456, which is in series with circuit unit 447. A coating power supply 452 operates at 6 kHz with a voltage of 230 kV. Coating power supply 452 is connected to first resonance contour 458. First resonance contour 458 is connected to power line 442 between the two series circuit units 447 and 453. Coating power supply 452 coupled to a second resonance contour 460, which is connected to second power line 444. The two resonance contours, 458 and 460, are used to prevent a 6 kHz voltage from passing to the 60 Hz power supply 440 and user 446.

Figure 12:
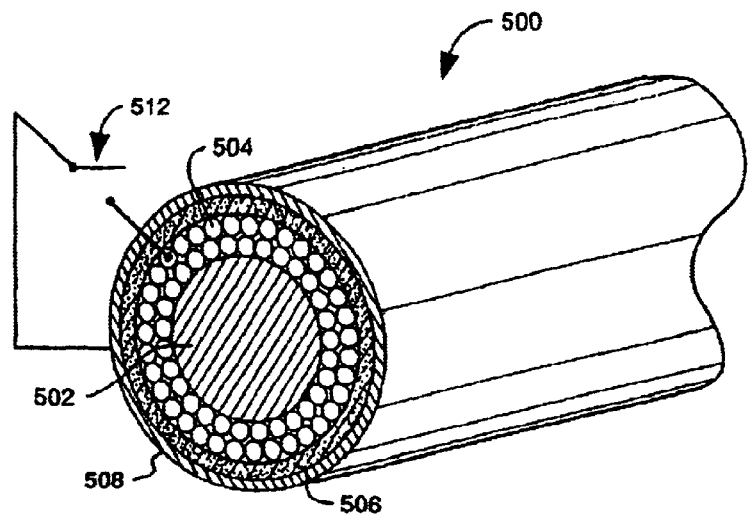
FIG. 12 depicts a power line de-icing system having a conductive shell that can be shorted to the conductor.
Figure 13:
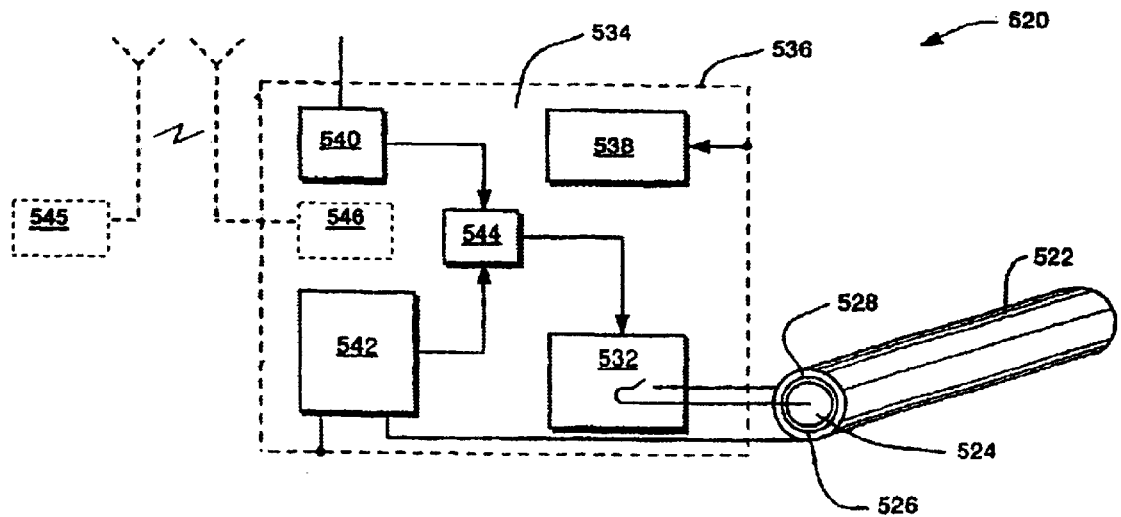
FIG. 13 shows an improved embodiment of a power line with local control of heating, having a coating, a conductive shell, a control box, an IGBT power switch, and local sensors.

FIG. 12 shows an example of an embodiment containing a conductive shell. FIG. 12 depicts a cross-sectional view of a power line 500. The power line 500 comprises cylindrically-shaped layers. The center of the power line 500 is a steel core 502. Surrounding the steel core 502 are main conductors 504, typically of aluminum. Outside the main conductors is a coating 506, typically a lossy dielectric, ferroelectric or semiconductive coating. The coating 506 is surrounded by an outer conductive shell 508, typically of aluminum. This embodiment provides for a flexible de-icing technology in which a coating is heated with conventional 50–60 Hz electric field. The de-icing technique is fully controllable in that it can be switched "on" or "off". Thus, no electric power is wasted when there are no icing or snow conditions. With reference to the structure of FIG. 12, to switch the heating off, the main conductors 504 are electrically connected by switch 512 to a conductive shell 508, with the coating between them. This provides zero potential difference across the ferroelectric, loss-dielectric or semiconductor coating 506 and, therefore, zero heating power. The conductive shell 508 may be very thin (0.1 to 1 mm) and, therefore, inexpensive. The conductive shell 508 may comprise aluminum or another metal or any conductive or semiconductive material, for example, polyurethane impregnated with carbon. When connected with the AC conductor (most of the time), it increases total cable conduction. Switching "on" and "off" may be done with a radio-controlled remote switch. The power line company typically installs one such simple (low-voltage, low power compare to the line's voltage) switch about every 100 km. Development of a lossy-dielectric coating then becomes inexpensive and simple because it must not be precisely "temperature tuned". Wider variety (and cheaper) materials can be used for the coating. These features thus provide for an electric switch that enables and disables heating of the power line selectively. Equivalent structures and methods may be used for other objects, besides power lines, to prevent or remove ice and snow. Such a system provides many advantages. First, the deicing can be fully controlled by the switch 512 to deice the power lines on demand. Second, power levels can be varied to heat wires. Also, this embodiment may be applied to low voltage power lines (below 100–345 kV), in addition to high voltage power lines. FIG. 13 depicts a block diagram of de-icing system 520 including an embodiment having local, autonomous control and switching. Power line 522 comprises main conductor 524, dielectric coating 526, and conductive shell 528. When switch 532 is closed, conductive shell 528 and conductor 524 are electrically shorted to each other. Preferably switch 532 is an IGBT power switch, which requires very little power. Control box 534 includes control box casing 536, which serves as a capacitive antenna, collecting energy from the AEF and providing it to power supply 538. Power supply 538 supplies on the order of 0.1 watts power to control box 534. Control box 534 also contains temperature sensor 540 and impedance sensor 542 for detecting ice. Impedance sensor 542 is preferably a 100 kHz impedance sensor. Signals from temperature sensor 540 and impedance sensor 542 are processed by controller logic 544, which activates switch 532 to open or close. Optional radio receiver 546 within control box 534 receives radio signals, from remote control device 545. for input to controller logic 544.

Figure 14:
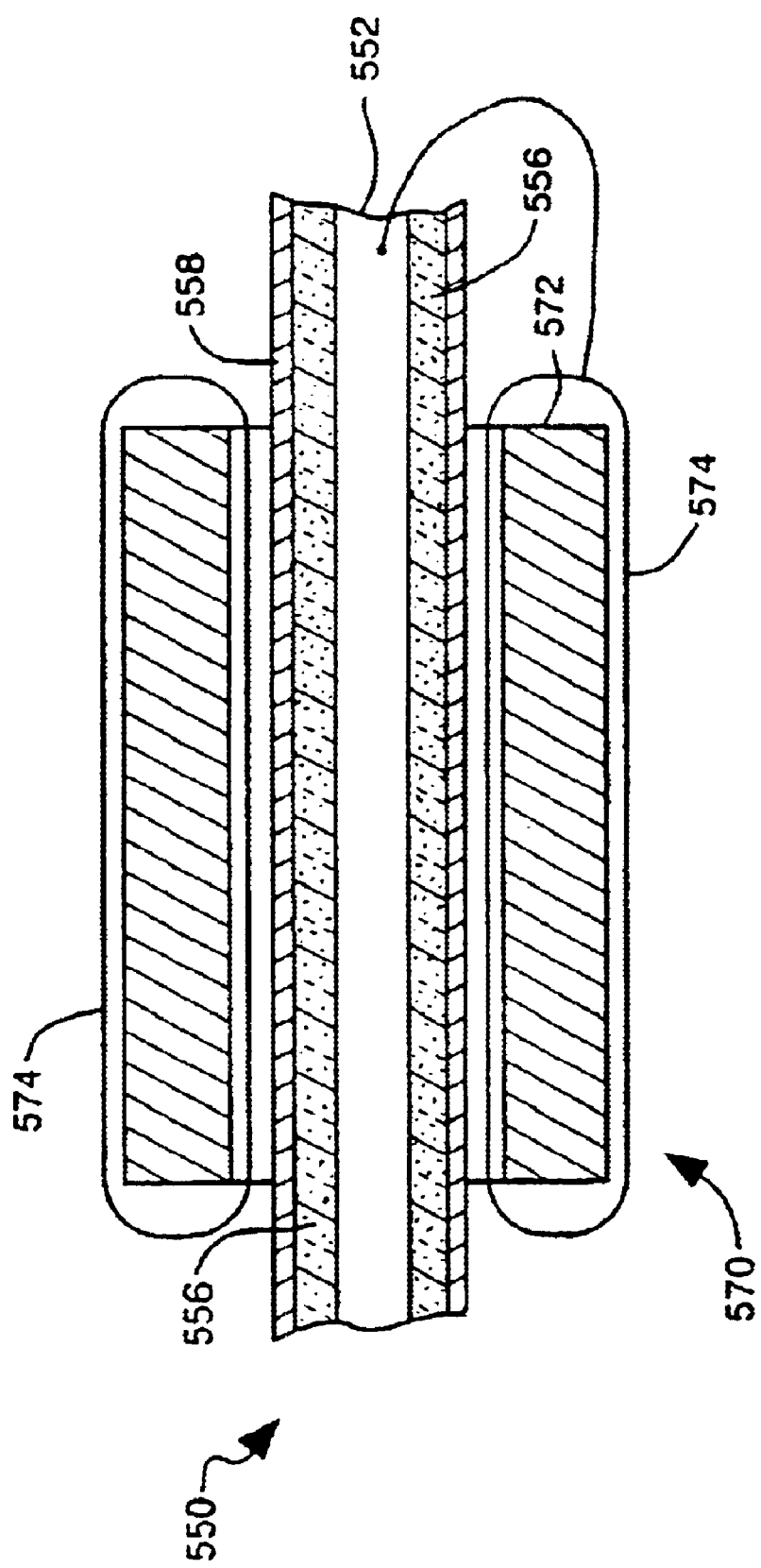
FIG. 14 an embodiment having a transformer installed on power line to provide energy to a coating.

FIG. 14 depicts an embodiment including power line 550 connected to a transformer 570. Power line 550 includes main conductor 552, coating 556, and conductive shell 558. Transformer 570 comprises a ferroelectric core 572 covered by a winding 574. Winding 574 is connected to conductive shell 558 and main conductor 552. Transformer 570 functions in a conventional manner. For example, in FIG. 14, the voltage drop along a 10 cm interval of main conductor 552 may typically be 1 millivolt. Transformer 570 typically transforms 60 Hz AC current at this low voltage to a 60 Hz AC current having a voltage on the order of 100 kV to 200 kV, sufficient to create an electromagnetic field capable of causing coating 506 to generate heat for de-icing along a distance on the order of 200 to 400 meters.

Figure 15:
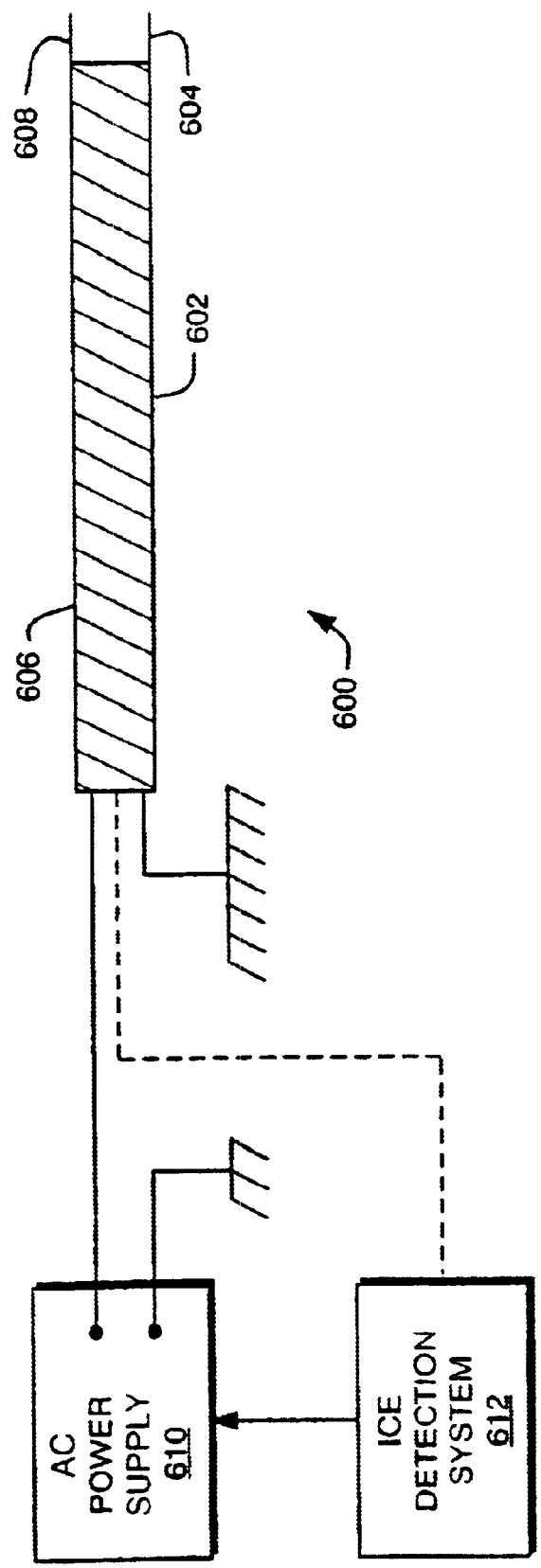
FIG. 15 depicts a generalized structure and system in accordance with the invention utilizing a dielectric, ferroelectric, ferromagnetic or semiconductor coating to de-ice a non-active surface (i.e., a surface without an internal AC electromagnetic field)
Figure 16:
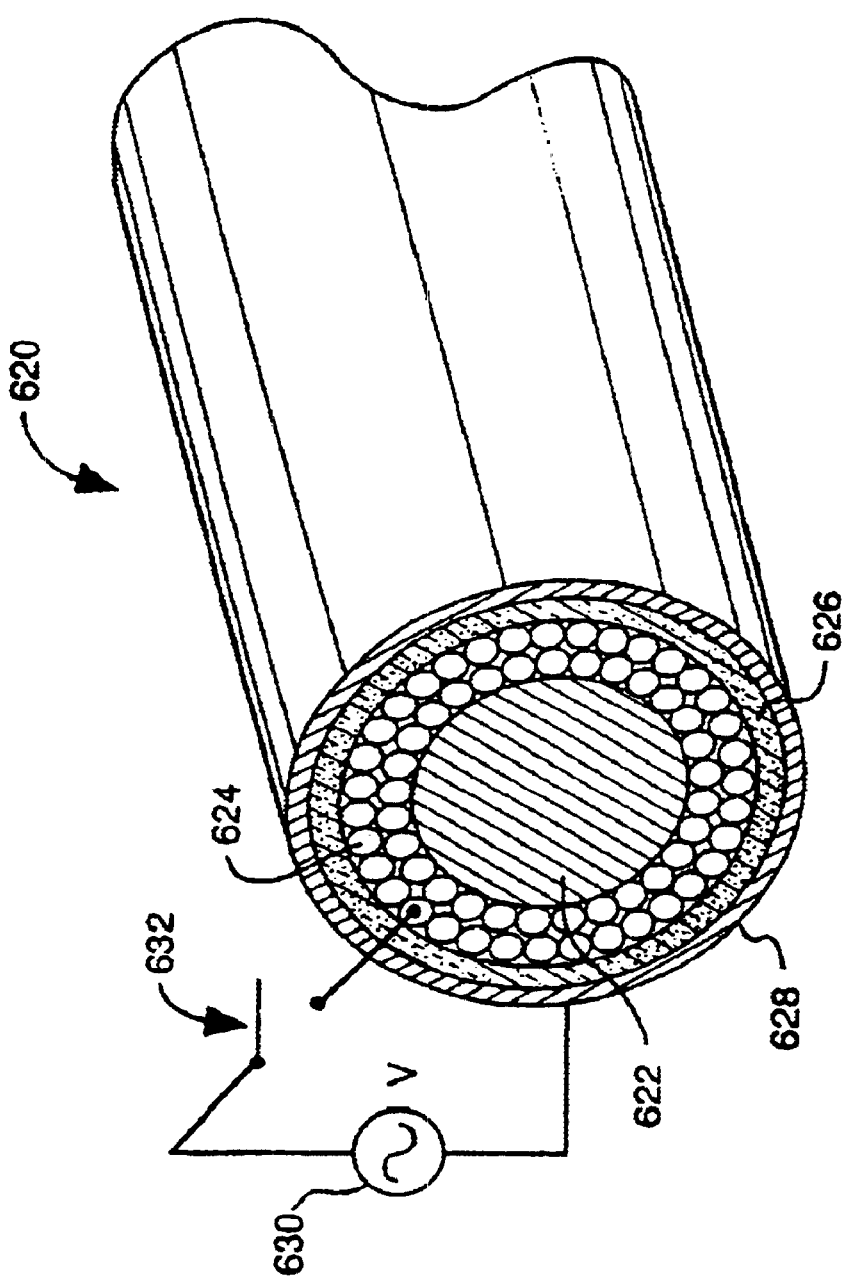
FIG. 16 depicts a cross-sectional view of a power line having an AC power supply to provide energy to the dielectric, ferroelectric, ferromagnetic or semiconductor coating.

FIG. 15 depicts a generalized structure and system 600 in accordance with the invention utilizing a dielectric, ferroelectric or semiconductor coating to de-ice a non-active surface (i.e., a surfaces without internal AC electric fields). In FIG. 15, a foil electrode 604 is disposed on the surface 602 of a structure or object to be protected from icing. A dielectric coating 606 is disposed on foil electrode 604. A foil electrode 608 is located on ferroelectric coating 606. Foil electrodes 604, 608 provide for application of AC power to the ferroelectric coating 606. The AC power derives from a standard AC power supply 610. An ice detection system 612 (e.g., an detection system as described with reference to FIG. 13), in circuit with the structure 600, preferably informs the power supply 610 of ice on the structure 600, wherein after AC power is applied. The AC frequency and coating thickness are chosen to generate heat at the desired quantities (e.g., so as to keep icing from forming on an aircraft wing). This embodiment may also be applied to a power line. For example, FIG. 16 depicts power line 620, having steel core 622, main conductors 624, coating 626 and conductive shell 628. A 60 Hz AC power supply 630 is located in series in series with switch 632, between conductors 624 and conductive shell 628.

The use of the AC power source provides many advantages. First, the deicing can be fully controlled by the switch 614 to deice the power lines on demand. Second, power levels can be varied to heat wires. Also, this embodiment may be applied at low voltage (below 100–345 kV), in addition to high voltage.

Figure 17:
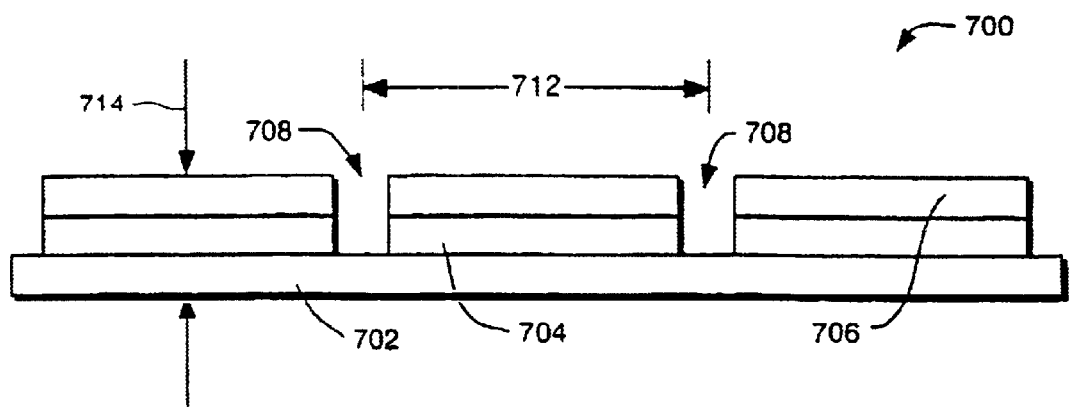
FIG. 17 depicts a cross-sectional view of a structure with spaced-apart electrodes.
Figure 18:
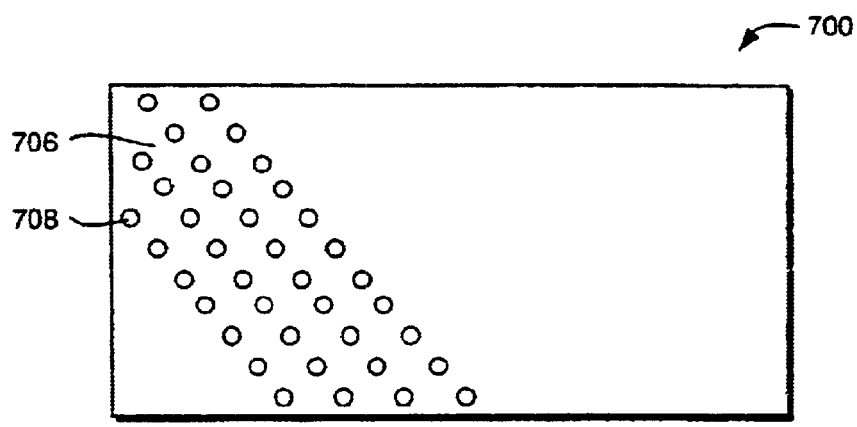
FIG. 18 depicts a top view of an embodiment of FIG. 17.
Figure 19:
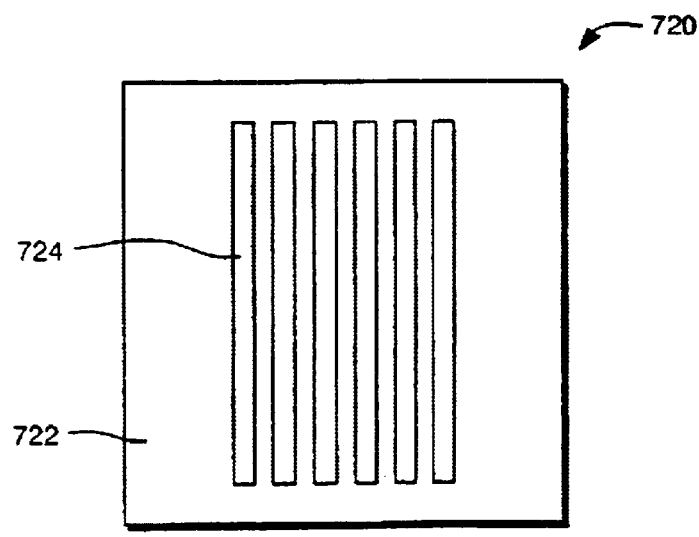
FIG. 19 depicts a structure comprising a substrate surface on which spaced-apart linear electrodes are disposed.

Embodiments in accordance with the invention also provide for spaced electrode configurations, as set forth below in FIGS. 17–19. FIG. 17 depicts a cross-sectional view of a structure 700 with spaced-apart electrodes 706. A substrate surface 702 is typically covered with a coating 704 and an outer conductive layer. Holes 708 through the outer conductive layer and insulating layer, down to the substrate surface form spaced apart electrodes 706. The space-to-space distance 712 is typically 10 to 100 $\mu$m. The total thickness of outer electrode layer 706 is typically on the order of about 10 $\mu$m. FIG. 18 depicts a top view of an embodiment in accordance with the invention as depicted in FIG. 17. Those skilled in the art should appreciate that different configurations of the electrode spacing may be made. For example, in FIG. 19, a structure 720 comprises a substrate surface 722 on which linear electrodes 724 are disposed. Preferably, the electrodes 724 are spaced apart by 10–50 $\mu$m, and each electrode has a width of 10–50 $\mu$m. An exemplary fabrication method for making spaced-apart electrodes in accordance with the invetnion includes: coating the surface with polyurethane; applying a layer of photoresist; exposing with light the exposure region definging the electrode grid pattern (e.g., holes in FIG. 17, strips in FIG. 19); removing exposed regions to expose polyurethane; applying graphite powder; heating to diffuse graphite into the polyurethane. This method makes the electrodes durable and non-corrosive. The resulting structure essentially contains an electrode grid formed of plastic doped with carbon (a conductor), forming the exact pattern by photolithography.

Figure 20:
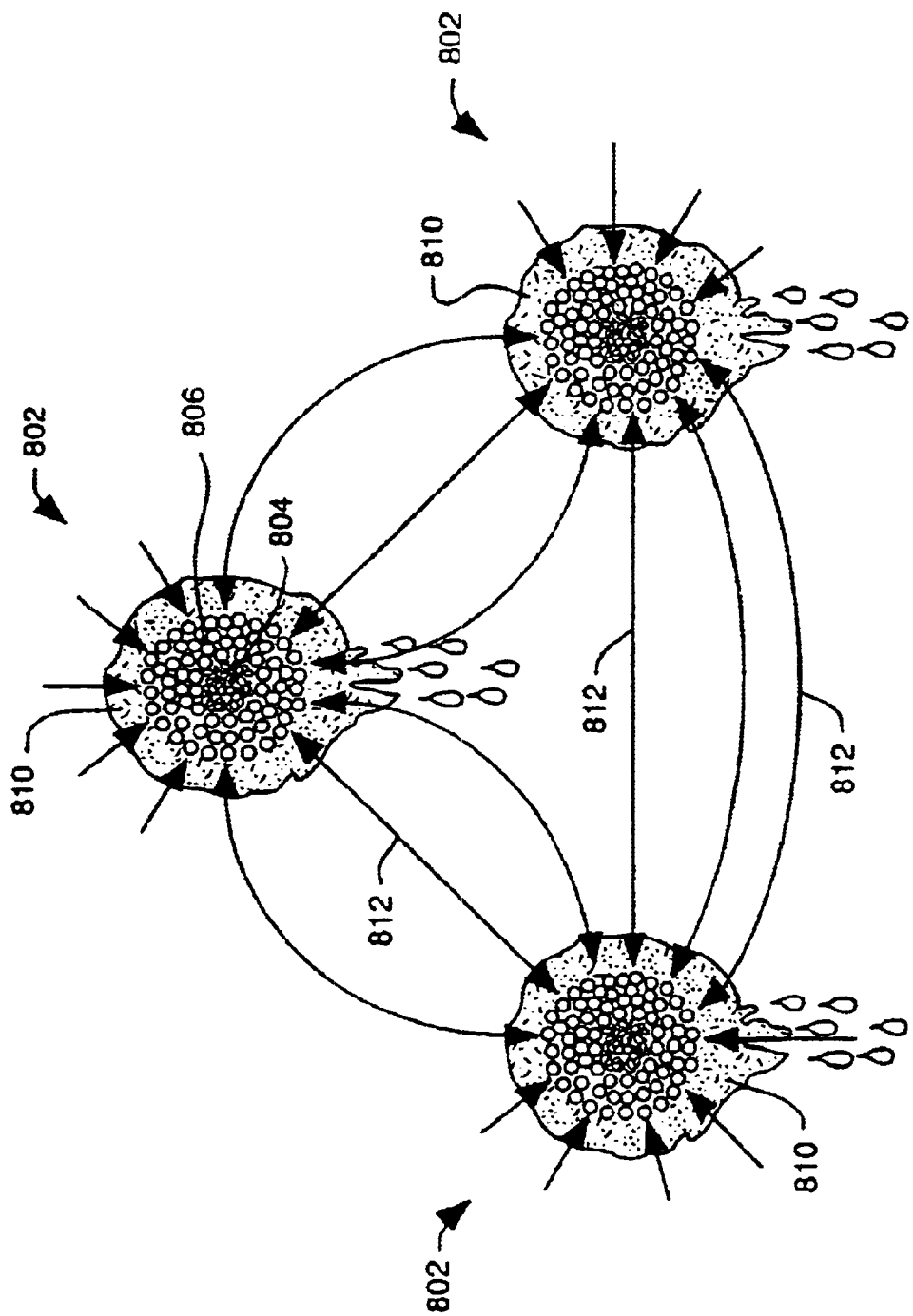
FIG. 20 depicts a de-icing system in which ice itself is used as the lossy dielectric coating.
Figure 21:
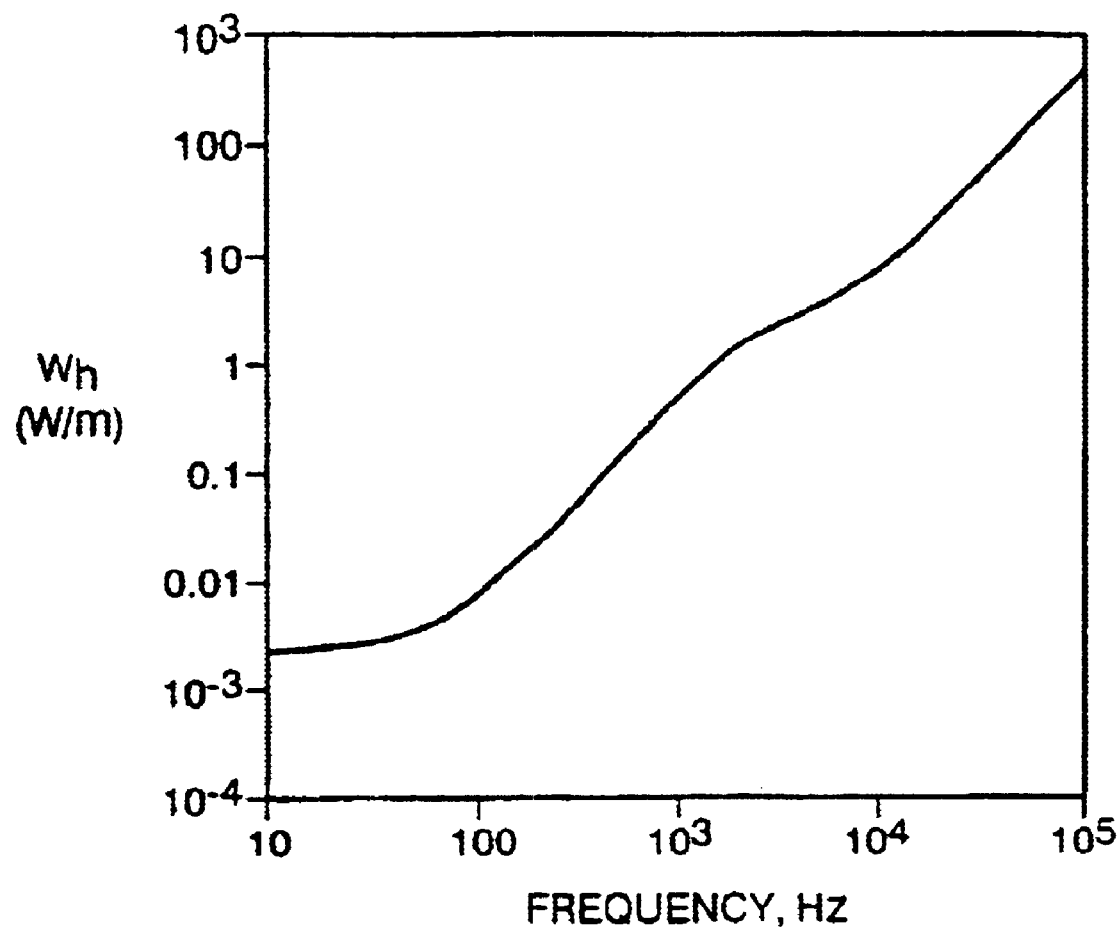
FIG. 21 shows a graph in which heating power (dissipated heat), $W_h$, in units of watts per meter, is plotted as a function of frequency for a layer of ice on a 5.1 cm diameter power-line cable, at a voltage of 30 kV.

In the embodiment described above, a dielectric coating was disposed on a power line, and either the interwire electric field or a specifically applied AC voltage was used to heat the coating and, thereby, melt ice. In a further embodiment of the invention, depicted in FIG. 20, ice itself is used as the dielectric coating. FIG. 20 depicts three typical power lines 802 in a 3-phase power transmission system, each comprising a steel core 804 surrounded by aluminum main conductors 806 and covered by ice 810. Electric field lines 812 represent a high-frequency interwire electric field. Ice is a lossy dielectric with a maximum dielectric loss at so-called Debye frequence fD. When placed in an alternating electric field of that frequency and of sufficient strength, ice melts. This is the same mechanism that uses an open lossy-dielectric coating (i.e., with no outer conductive layer), as depicted in FIG. 2, but now with ice as a coating. FIG. 21 shows a graph in which heating power (dissipated heat), Whz in units of watts per meter, is plotted as a function of frequency for a layer of ice on a 5.1 cm diameter power-line cable, at a voltage of 30 kV. Under these conditions, the required heating power of 50 to 150 watts per meter is achieved at a frequency of about 50 kHz. Thus, to reduce or eliminate icing of power lines, one applies an AC voltage of high frequency to the cables; for example, in the range of from 50 Hz to 150 Hz. When there is no ice, there is no power consumption. This provides an inexpensive and simple solution to the problem of icing. When ice appears on the cables, the system works as a dielectric coating heated by the AC electric field, melting the ice. Water on the cables does not absorb AC power because water has a dielectric-loss maximum in a microvave frequency range. The same principle works for refrigerators and for airplanes. The ice-dielectric heating may be switched "on" by supplying high-frequency AC current in the main conductors when ice is present; it may be turned "off" by using low-frequency AC, for example 60 Hz.

In a further embodiment in accordance with the invention, skin-effect heating is used to melt ice on a long-distance power line. A magnetic field pushes electrical current lines towards the surface of a conductor. In a case of high-frequency current flow in aluminum at 60 kHz, for example, the current flows in the outer 0.35 mm of the conductor. For a power line with a diameter of 2.5 cm, this current crowding increases the resistance by a factor of approximately 20. With 221 amps of current, this results in a maximum heating power of approximately 50 W/m. Unlike ice-dielectric heating, skin-effect heating occurs even when no ice is present. Thus, energy dissipation of skin-effect heating can only be switched "off" by using low-frequency AC current.

Figure 22:
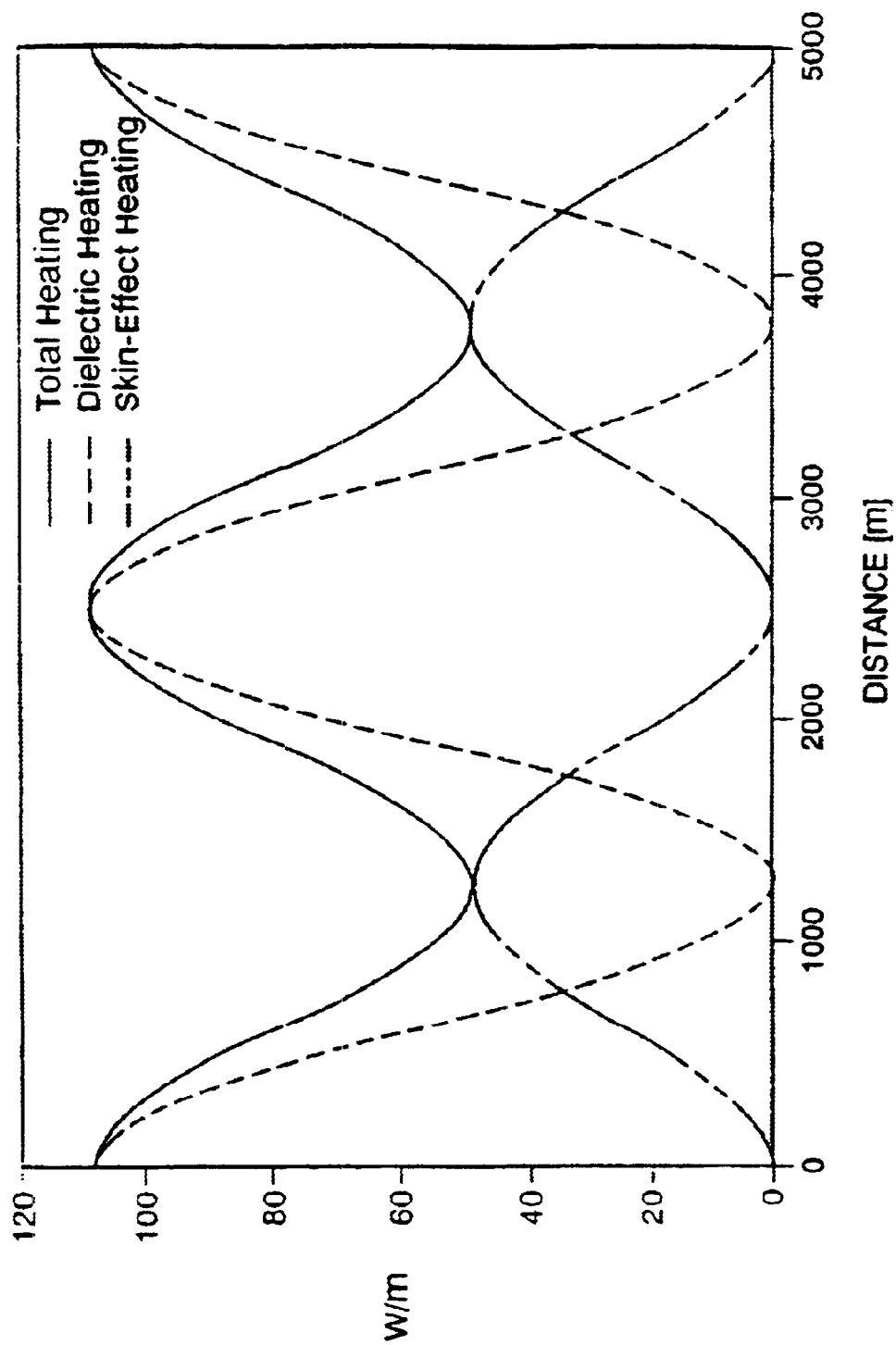
FIG. 22 shows a graph in which heating power of ice-dielectric heating, skin-effect heating and their sum, in units of watts per meter, are plotted as functions of distance in meters, m, along a power line.
Figure 23:
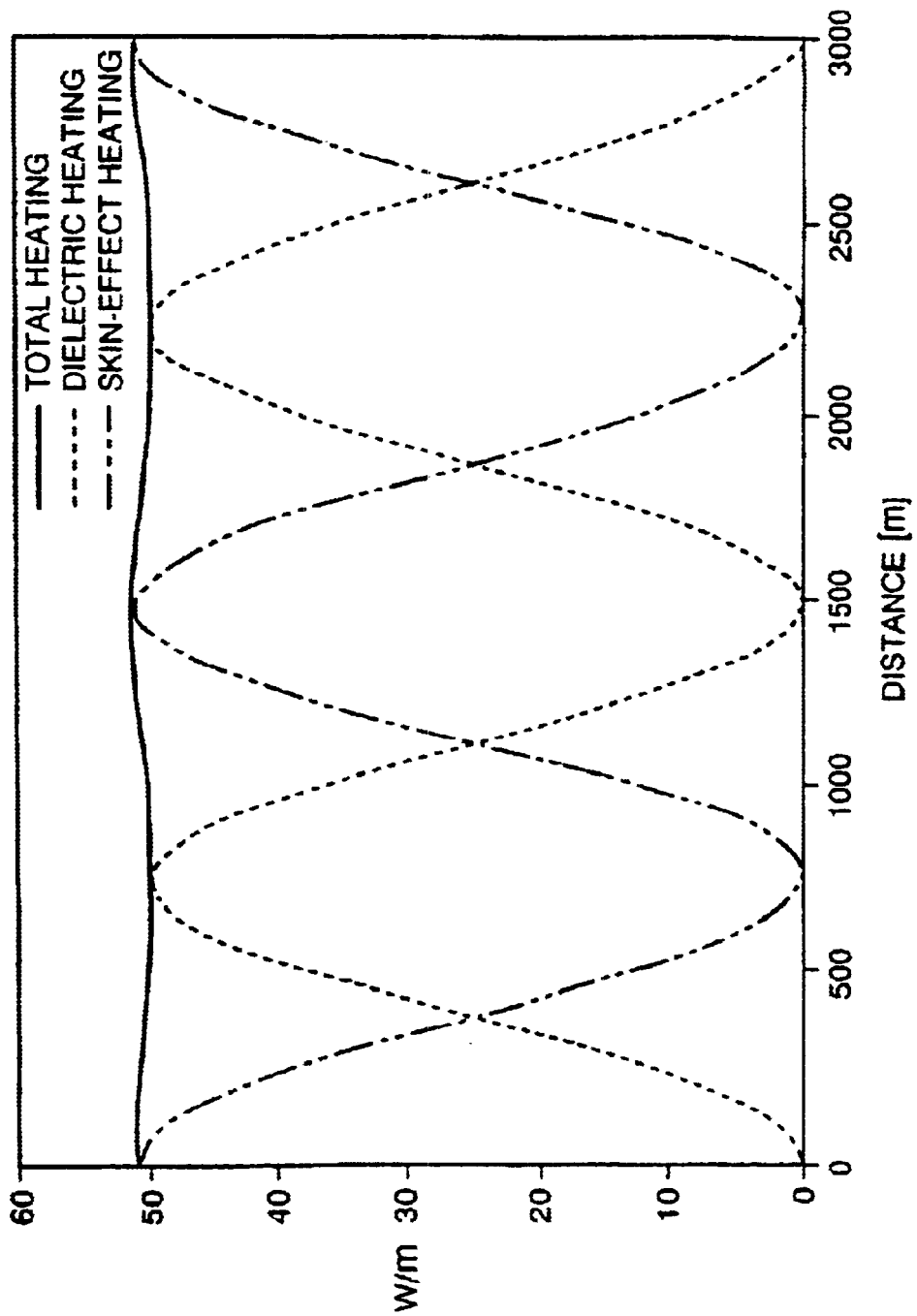
FIG. 23 shows the results over a distance of 3000 m in a power line when frequency of the AC current is tuned to balance ice-dielectric heating and skin effect heating to maximize total heating.
Figure 24:
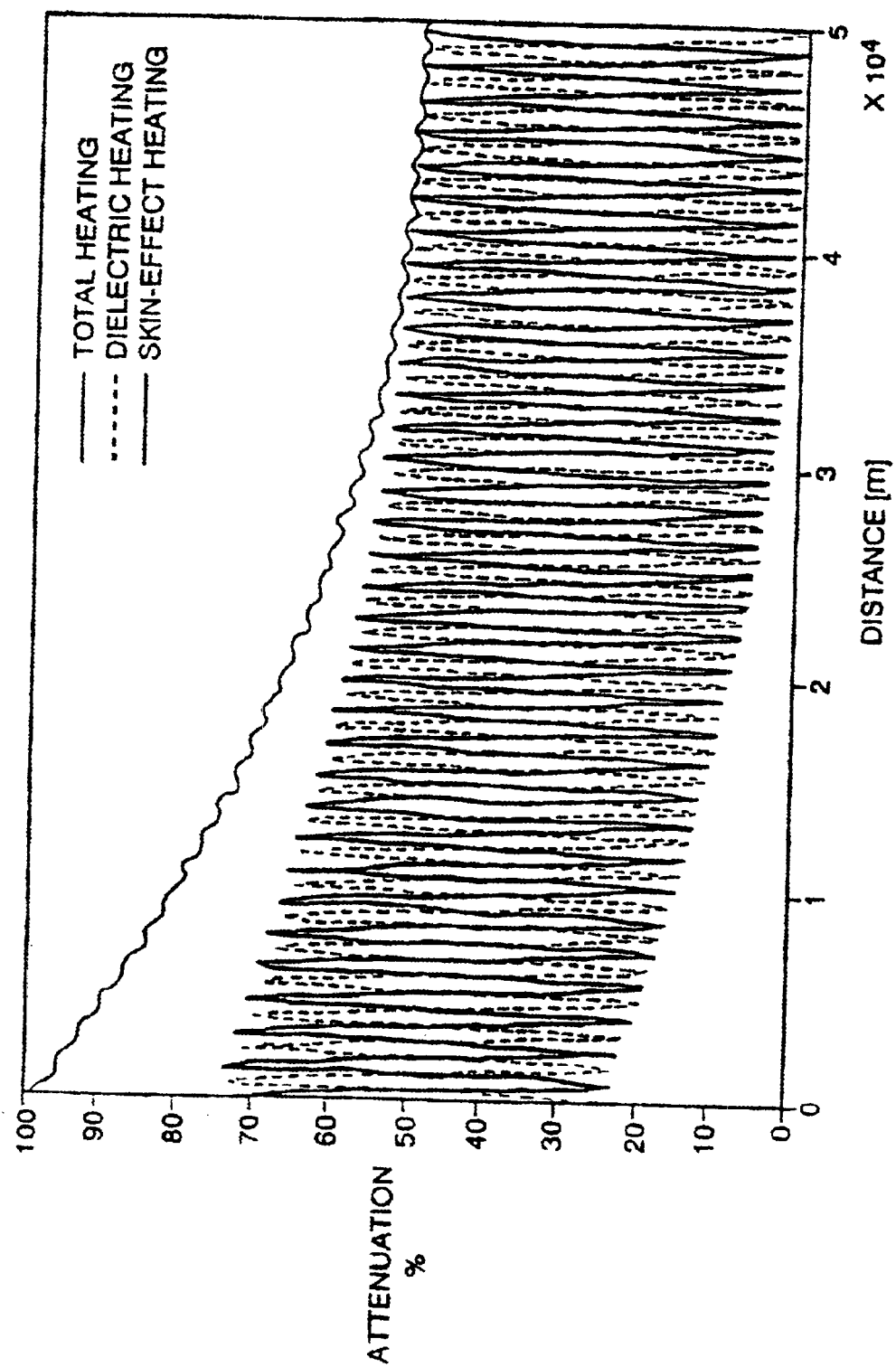
FIG. 24 depicts calculated percentage attenuation of heating power in the improved embodiment of FIG. 23 over a distance of 50 km.
Figure 25:
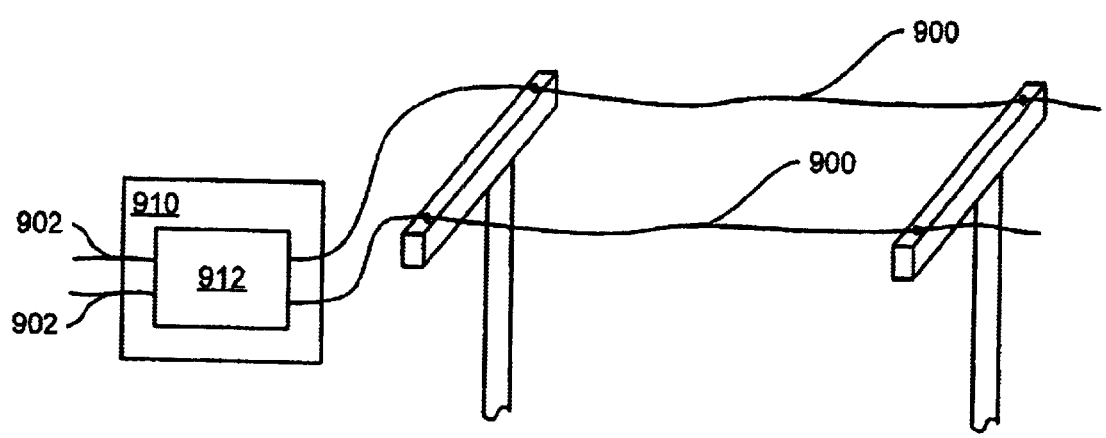
FIG. 25 shows a frequency tuner and a frequency multiplier connected to a power line to combining high-frequency ("HF") ice dielectric heating and HF skin-effect heating.

FIG. 25 illustrates one embodiment combining high-frequency ("HF") ice dielectric heating and the HF skin-effect heating. Both ice dielectric loss and the skin effect are subject to standing wave phenomena, as depicted in FIG. 22. A frequency tuner 910 uses a frequency multiplier 912 to tune the frequency of AC power supplied to power lines 900 to make the peaks and valleys of heating from the two effects complement each other. Frequency multiplier 912 converts the frequency of the AC power received at inputs 902 and supplies frequency tuned power to power line 900. The effects of this embodiment are depicted in the graph of FIG. 23, in which heating power, $W_h$, in units of watts per meter, is plotted as a function of distance in meters, m, from a power source. FIG. 23 shows that the total heat effect is relatively constant at about 50 W/m over a distance of 3000 m. In an improved embodiment, the frequency of the current through the power line is varied to balance the heating effects at various spatial locations of the conductor. FIG. 24 depicts the calculated percentage attenuation of heating effects of the improved embodiment of FIG. 20 over a distance of 50 km. The data of FIG. 24 indicate that a 100 km power line could be heated and de-iced using a single driver located at the center. For example, the power source for a 50 km line should possess about 3.25 MW at 60 kHz. With a total heating power, $W_h$, of 50 W/m, and a convective loss of 25 W/m, leaving a net heating power of 25 W/m, calculations indicate that 0.5 cm of ice may be removed from the three phases of a 3-phase transmission system in about 3 hours, by switching the heating about every 10–20 minutes between power lines.

The various embodiments in accordance with the invention provide relatively simple, reliable and inexpensive systems and methods for preventing and removing ice on the surface of an object. Although the embodiments have been described principally with regard to power line de-icing, the structures and methods herein described are applicable to many other types of objects. Since certain changes may be made in the above apparatus and methods without departing from the scope of the invention, it is intended that all matter contained in the above description or shown in the accompanying drawing be interpreted as illustrative and not in a limiting sense.

What is claimed is:

1. A system of removing or preventing ice and snow on a surface of an object, comprising:
   an electrical conductor for generating an alternating electric field in response to an AC voltage; and
   a coating integral with the surface of the object and with the electrical conductor, the coating capable of absorbing energy from the alternating electric field to generate heat.

2. A system as in claim 1, wherein the coating contains a material selected from the group consisting of ferroelectric, lossy dielectric, and semiconductor materials.

3. A method of melting ice on a surface of a power line, comprising steps of:
   applying a high-frequency AC voltage having a frequency in a range of about from 0.5 kHz to 300 kHz and a voltage in a range of about from 10 kV to 1000 kV to the power line, wherein the AC voltage generates an alternating electric field and the ice absorbs energy from the alternating electric field.

4. A system as in claim 1, further comprising:
   a conductive shell, the coating disposed between the electrical conductor and the conductive shell; and
   a switch for electrically shorting the electrical conductor to the conductive shell.

5. A system as in claim 4, wherein the switch includes an IGBT power semiconductor switch.

6. A system as in claim 5, further comprising a control box for controlling the switch, the control box deriving power from the alternating electric field.

7. A system as in claim 6, wherein the control box is remotely controllable.

8. A system as in claim 7, wherein the control box is remotely controllable by a signal selected from the group consisting of a radio signal and carrier signal.

9. A system as in claim 6, further comprising a local sensor for local and autonomous control of the switch.

10. A system as in claim 9, wherein the local sensor includes a sensor selected from the group consisting of a temperature sensor and an impedance sensor.

11. A system as in claim 6, wherein the control box includes a control box case, the control box case serving as an antenna for gathering energy from the alternating electric field to power the control box.

12. A system as in claim 1 further comprising a transformer, the transformer increasing the AC voltage.

13. A system as in claim 1, further comprising a frequency multiplier.

14. A system as in claim 1, further comprising an AC power source, wherein the AC power source provides AC power having a voltage in a range of from 10 kV to 1000 kV.

15. A system as in claim 14, wherein the AC power source provides high-frequency AC power having a frequency in a range of about from 0.5 kHz to 300 kHz.

16. A system as in claim 15, further comprising a low-frequency AC power source for providing AC power having a frequency in a range of about from 40 Hz to 500 Hz.

17. A system as in claim 16, wherein the coating comprises ice.

18. A system as in claim 1 further comprising a means for frequency-tuning the high-frequency AC power to change a heating pattern produced by standing wave effects of ice-dielectric heating and skin-effect heating.

19. A system as in claim 1, wherein the object comprises an electrical power line, the electrical conductor comprises a main conductor of the power line, and the coating surrounds the main conductor.

20. A system of removing ice on a power line, comprising:
   a power line having an electrical conductor;
   a high-frequency AC voltage in the electrical conductor having a voltage in a range of about from 10 kV to 1000 kV and a frequency in a range of about from 0.5 kHz to 300 kHz. where energy from an alternating electric field generated by the high-frequency AC voltage is dissipated in the ice as heat, thereby melting or detaching the ice from the power line.

21. A method of removing or preventing ice and snow on a surface of an object, comprising:

applying an AC voltage to an electrical conductor to produce an alternating electric field in a coating integral with the surface of the object, wherein the coating absorbs energy from the alternating electric field to generate heat.

22. A method as in claim 21, wherein the coating comprises a material selected from the group consisting of dielectric, ferroelectric, and semiconductor materials.

23. A method as in claim 21, wherein the step of applying an AC voltage includes applying AC voltage in a range of about from 10 kV to 1000 kV.

24. A method as in claim 21, further comprising electrically shorting the electrical conductor to a conductive shell, the coating being located between the electrical conductor and the conductive shell.

25. A method as in claim 21, wherein the step of applying an AC voltage to an electrical conductor includes applying a high-frequency AC voltage in the electrical conductor having a frequency in a range of about from 0.5 kHz to 300 kHz.

26. A method as in claim 25, further comprising switching between applying the high-frequency AC voltage and applying a low-frequency AC voltage in a range of about from 40 Hz to 500 Hz.

* * * * *